US010827395B2

(12) United States Patent
Dasgupta et al.

(10) Patent No.: US 10,827,395 B2
(45) Date of Patent: Nov. 3, 2020

(54) METHODS AND APPARATUS FOR SELECTING A SERVING GATEWAY FOR A SESSION OF A USER EQUIPMENT (UE) IN A MOBILE NETWORK HAVING 5G NON-STANDALONE (NSA) ARCHITECTURE DEPLOYMENTS

(71) Applicant: Cisco Technology, Inc., San Jose, CA (US)

(72) Inventors: Sandeep Dasgupta, Bangalore (IN); Mantha Ravi Sankar, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/134,854

(22) Filed: Sep. 18, 2018

(65) Prior Publication Data

US 2020/0092759 A1 Mar. 19, 2020

(51) Int. Cl.
*H04W 76/15* (2018.01)
*H04W 36/00* (2009.01)
(Continued)

(52) U.S. Cl.
CPC ......... *H04W 36/0027* (2013.01); *H04W 8/20* (2013.01); *H04W 76/15* (2018.02); *H04W 88/16* (2013.01)

(58) Field of Classification Search
CPC . H04W 36/0027; H04W 76/15; H04W 76/18; H04W 76/27; H04W 8/20; H04W 88/16
See application file for complete search history.

(56) References Cited

U.S. PATENT DOCUMENTS

2014/0241317 A1* 8/2014 Jamadagni ............ H04L 5/0032
370/331
2016/0174285 A1* 6/2016 Ke .......................... H04W 8/06
370/329
(Continued)

FOREIGN PATENT DOCUMENTS

WO 2018025291 A1 2/2018

OTHER PUBLICATIONS

"5G NSA(Non-Standalone Architecture)", P-GW Administration Guide, StarOS Release 21.7, 1-6.
(Continued)

*Primary Examiner* — Marcus Hammonds

(57) ABSTRACT

One or more controllers of a control plane (CP) entity for use in a mobile network (e.g. a mobility management entity or "MME") may be configured to receive or obtain an indication which indicates whether an eNodeB (eNB) is configured to support Dual Connectivity with New Radio (DCNR), for a 5G Non-Standalone (NSA) architecture deployment. The one or more controllers may be further configured to select, based on the indication, one of a plurality of serving gateways (SGWs) for a session of a user equipment (UE) served by the eNB. Additional information may be used as a basis for the SGW selection, including UE capability and UE subscription data. For example, when the indication indicates that the eNB is configured to support DCNR and the UE capability and subscription data indicate 5G capability, a 5G-capable SGW may be selected but otherwise a legacy (non-5G) SGW may be selected.

19 Claims, 13 Drawing Sheets

(51) Int. Cl.
*H04W 8/20* (2009.01)
*H04W 88/16* (2009.01)

(56) References Cited

U.S. PATENT DOCUMENTS

| | | | | |
|---|---|---|---|---|
| 2016/0212775 | A1* | 7/2016 | Xu | H04W 76/10 |
| 2016/0323926 | A1* | 11/2016 | Gao | H04W 76/10 |
| 2017/0332325 | A1 | 11/2017 | Nan et al. | |
| 2018/0192443 | A1 | 7/2018 | Novlan et al. | |
| 2019/0082486 | A1* | 3/2019 | Jeong | H04L 29/08 |
| 2019/0098544 | A1* | 3/2019 | Han | H04W 36/00 |
| 2019/0098684 | A1* | 3/2019 | Tamura | H04W 4/24 |
| 2019/0380172 | A1* | 12/2019 | Xu | H04W 92/20 |

OTHER PUBLICATIONS

Qualcomm Incorporated, Ericsson, Verizon Wireless, AT&T, "Addition of UE NAS capability for support of dual connectivity with NR", 3GPP TSG-CT WG1 Meeting #105, Aug. 24, 2017, 15 pages.
Qualcomm Incorporated, SK Telecom, Ericsson, Vodafone, KDDI, ATT, NTT Docomo, "NAS UE indicator for Dual Connectivity with NR", 3GPP TSG-SA WG2 Meeting #122, Jun. 26, 2017, 6 pages.
Vodafone, SK Telecom, KDDI, AT&T, "Enable SGW-C & PGW-C selection of UPF to take UE's NR capabilities into account", 3GPP TSG-SA WG2 Meeting #122bis, Aug. 25, 2017, 4 pages.
3GPP Organizational Partners, "3rd Generation Partnership Project; Technical Specification Group Core Network and Terminals; Non-Access-Stratum (NAS) protocol for Evolved Packet System (EPS); Stage 3 (Release 15)", 3GPP TS 24.301 V15.3.0, Jun. 2018, 528 pages.
3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.5.0, Sep. 2018, 410 pages.
3GPP Organizational Partners, "3rd Generation Partnership Project; Technical Specification Group Services and System Aspects; Architecture enhancements for control and user plane separation of EPC nodes; Stage 2 (Release 15)", 3GPP TS 23.214 V15.4.0, Sep. 2018, 92 pages.
3GPP Organizational Partners, "3rd Generation Partnership Project; Technical Specification Group Radio Access Network; Evolved Universal Terrestrial Radio Access Network (E-UTRAN); S1 Application Protocol (S1AP) (Release 15)", 3GPP TS 36.413 V15.2.0, Jun. 2018, 378 pages.
International Search Report and Written Opinion in counterpart International Application No. PCT/US2019/050558, dated Dec. 6, 2019, 18 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.0.0, Sep. 2018, 410 pages.
Nokia et al., "Selection of SGW & PGW optimized for 5G New Radio", 3GPP TSC CT4 Meeting #80, C4-175032, Oct. 2017, https://www.3gpp.org/ftp/tsg_ct/WG4_protocollars_ex-CN4/TSGCT4_80_Kochi/Docs/TDoc_List_Meeting_CT4%2380.xlsx, 3 pages.
3GPP, "3rd Generation Partnership Project; Technical Specification Group Core Network and Terminals; Interface between the Control Plane and the User Plane Nodes; Stage 3 (Release 15)", 3GPP TS 29.244 V15.2.0, Jun. 2018, 176 pages.
3GPP, "3rd Generation Partnership Project; Technical Specification Group Core Network and Terminals; Domain Name System Procedures; Stage 3 (Release 15)", 3GPP TS 29.303 V15.1.0, Mar. 2018, 73 pages.
3GPP,3rd Generation Partnership Project; Technical Specification Group Services and System Aspects; Architecture enhancements for control and user plane separation of EPC nodes; Stage 2 (Release 15), 3GPP TS 23.214 V15.4.0, Sep. 2018, 92 pages.
Huawei, "Application of Firewalls in the LTE IPSec Solution", retrieved from Internet May 21, 2020, 24 pages; https://support.huawei.com/enterprise/en/doc/EDOC1100087919.
Huawei, "Vo5G Technical White Paper", Jul. 2018, 29 pages.
Torbjörn Cagenius et al., "Simplifying the 5G ecosystem by reducing architecture options", Ericsson Technology Review, Nov. 30, 2018, 5 pages.
ZTE, "EPC-NSA Solution Fulfills Requirement of 5G Early Deployment" retrieved from Internet May 21, 2020, 5 pages; https://sdnfv.zte.com.com.cn/solutions/VNF/5G-core-network/EPC-NSA.
Oracle Communications, "5G Core: How to Get There", Oracle Communications White Paper, Sep. 21, 2018, 14 pages.

* cited by examiner

METHODS AND APPARATUS FOR SELECTING A SERVING GATEWAY FOR A SESSION OF A USER EQUIPMENT (UE) IN A MOBILE NETWORK HAVING 5G NON-STANDALONE (NSA) ARCHITECTURE DEPLOYMENTS

TECHNICAL FIELD

The present disclosure relates generally to methods and apparatus for selecting a serving gateway (SGW) in a mobile network for a session of a user equipment (UE), and more particularly to selecting a SGW in a mobile network having 5G Non-Standalone (NSA) architecture deployments.

BACKGROUND

There is a need for improved methods and apparatus for use in selecting a serving gateway (SGW) for a session of user equipment (UE) in a mobile network having 5G Non-Standalone (NSA) architecture deployments, especially methods and apparatus that provide a more optimal assignment and utilization of (e.g. potentially limited) 5G network resources in such a mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
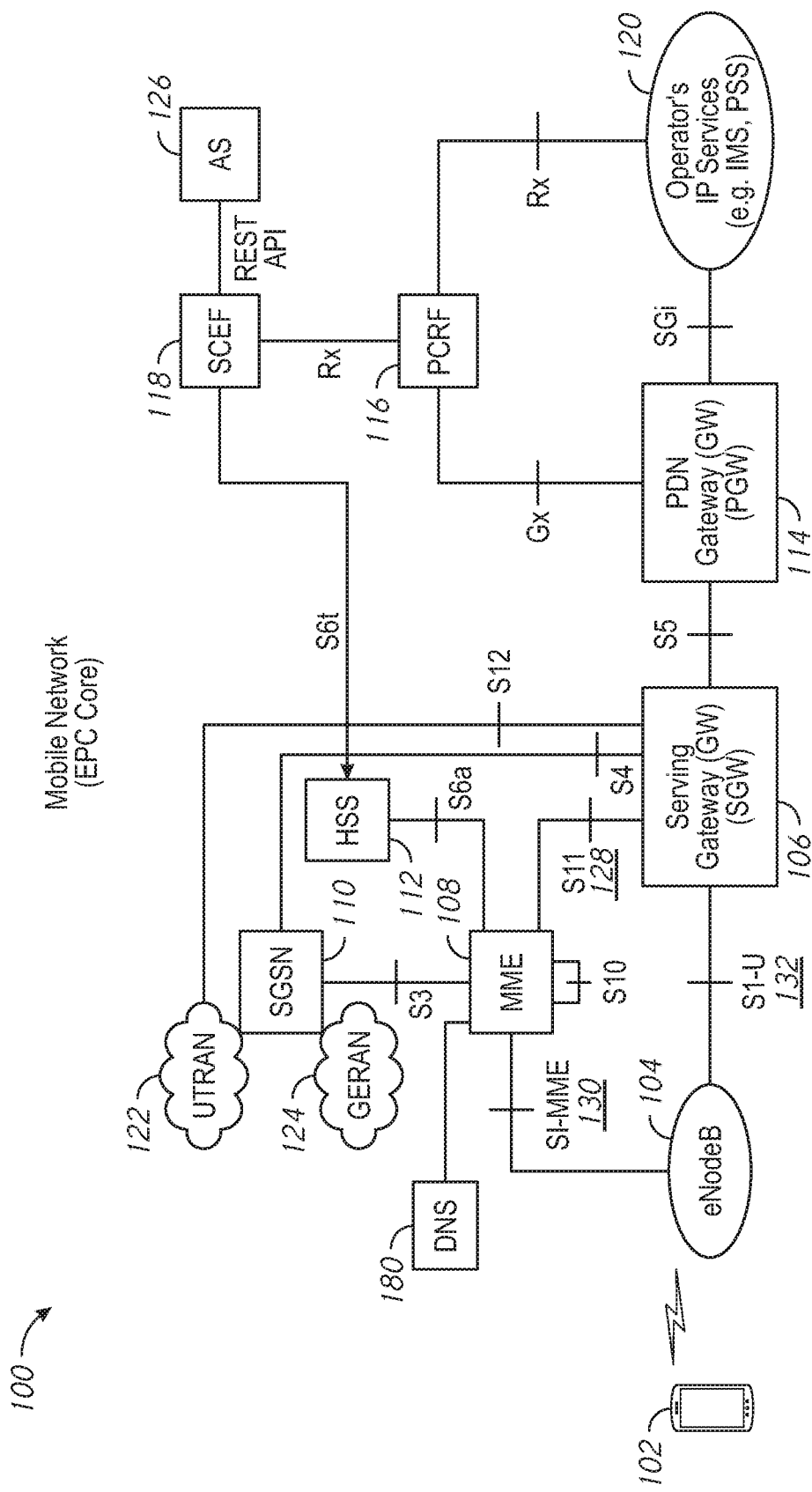
FIG. 1A is an illustrative representation of a network architecture of a 4G, Long Term Evolution (LTE), Evolved Packet Core (EPC) based mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for selecting a serving gateway (SGW) for a session of a user equipment (UE) in a mobile network having 5G Non-Standalone (NSA) architecture deployments are described herein.

In one illustrative example, one or more controllers of a control plane (CP) entity for use in a mobile network (e.g. a mobility management entity or "MME") may be configured to receive or obtain an indication which indicates whether an eNodeB (eNB) is configured to support Dual Connectivity with New Radio (DCNR), for a 5G NSA architecture deployment. The one or more controllers may be further configured to select, based on the indication, one of a plurality of SGWs for a session of a UE served by the eNB. Additional information may be used as a basis for the SGW selection, including UE capability and UE subscription data. For example, when the indication indicates that the eNB is configured to support DCNR and the UE capability and subscription data indicate 5G capability, a 5G-capable SGW may be selected but otherwise a legacy (non-5G) SGW is selected. The steps of the technique may be triggered in response to establishment of a session for the UE, identification of a handover of the session for the UE, or identification of a dynamic change in the configuration of the eNB, as examples. Accordingly, the present techniques may provide for a more optimal assignment and utilization of (e.g. potentially limited) 5G network resources in such mobile networks.

More detailed and alternative techniques and implementations are provided herein as described below.

Example Embodiments

As part of 5G evolution, the $3^{rd}$ Generation Partnership Project (3GPP) has adopted a phased-approach with its introduction of both Non-Standalone (NSA) and Standalone (SA) architectures for 5G mobile networks. In initial 5G NSA architecture deployments, only some existing eNodeBs (eNBs) in the mobile network may be connected to a 5G New Radio (5G-NR) (or "gNB") via an X2 interface, and only some serving gateway control planes (SGW-Cs) and user planes (SGW-Us) in the mobile network may be configured with 5G capabilities.

Per various $3^{rd}$ GPP change requests (CRs) and specifications, a 5G-capable user equipment (UE) may publish its communication capability to a mobile network. A mobility management entity (MME) of the mobile network may be expected to extract this communication capability as well as fetch subscription data associated with the subscriber from a home subscriber server (HSS). During selection of the serving and/or PDN gateway (S/PGW) for a UE session, the MME may be expected to select a S/PGW capable of handling 5G sessions if the UE has 5G capability and the subscription data allows for it.

It has been observed, however, that a 5G-capable UE may not be in the vicinity of any 5G NR node and hence, the 5G-capable UE may connect via a LTE eNB that does not support 5G. In this case, as the UE capability and subscription data still indicate 5G support, the MME would still select a 5G-capable SGW even through its 5G capability is not needed. Even when the UE initially connects to a 5G NR, it may be subsequently moved to a location where 5G NR is not available and all of the associated bearers are moved to 4G radio.

Network slicing is one aspect of 5G network design, where SGW nodes are provided with storage and computing resources based on the type of services they are expected to provide. In 5G, the user plane (UP) needs to support very high data rates and therefore it requires specific network resources to allow for high speed data transfers and large data buffering. The allocation of such storage and computing resources may be optimized when there is an assurance that only bearers providing 5G services are assigned to them.

Given the above, many UE sessions will not be connected via 5G NR but nevertheless assigned to 5G-capable SGWs. This is an inefficient use of precious (e.g. potentially limited) 5G network resources, as the sessions could have been handled by other (e.g. 4G) network resources.

Accordingly, there is a need for improved methods and apparatus for use in a selecting a SGW for a session of a UE in a mobile network having 5G NSA architecture deployments, especially methods and apparatus for providing a more optimal assignment and utilization of 5G network resources (e.g. at least initially, potentially limited 5G network resources) in such mobile networks.

FIG. 1A is an illustrative representation of a network architecture 100 of a 4G, Long Term Evolution (LTE) based mobile network having an Evolved Packet Core (EPC) in which techniques and components of the present disclosure may be implemented. The mobile network of FIG. 1A may be configured with a control and user plane separation (CUPS) architecture, described later in relation to FIG. 1B.

The network architecture 100 of FIG. 1A may include a mobility management entity (MME) 108, a serving GPRS support node (SGSN) 110, a home subscriber server (HSS) 112, a policy and charging rules function (PCRF) 116, a service capability exposure function (SCEF) 118, a serving gateway (GW) 106 (or "SGW"), and a packet data network (PDN) gateway (GW) 114 (or "PGW"). A plurality of interfaces shown in network architecture 100 of FIG. 1A (e.g. S1-U, S1-MME, S3, S4, S5, S6a, S10, S11, S12, Gx, Rx, SGi, and S6t) may be defined by messaging and/or protocols described in the relevant standards documents. MME 108 may interface with HSS 112, SGSN 110, as well as a domain name server (DNS) 180. MME 108 may also interface with SGW 106 via an S11 interface 128, and with an eNodeB (eNB) 104 via an S1-MME interface 130. The eNB 104 may interface with SGW 106 via an S1-U interface 132.

A UE 102 may be configured to access and communicate in the mobile network via eNB 104. UE 102 may be any suitable type of device, such as a cellular telephone, a smart phone, a tablet device, a laptop computer, an Internet of Things (IoT) device, and a machine-to-machine (M2M) communication device, to name but a few. For additional communication access, one or more additional UTRANs 122 and one or more GSM edge radio access networks (GERAN) 124 may be connected in the network. An operator may provide an IP service network 120 with connection to the network via PCRF 216 and PDN gateway 214. The IP service network 120 may provide various IP services, such as IP multimedia services (IMS), packet-switched streaming services (PSS), etc. An application server (AS) 126 may connect to the mobile network via SCEF 118 via a REST API.

Figure 1B:
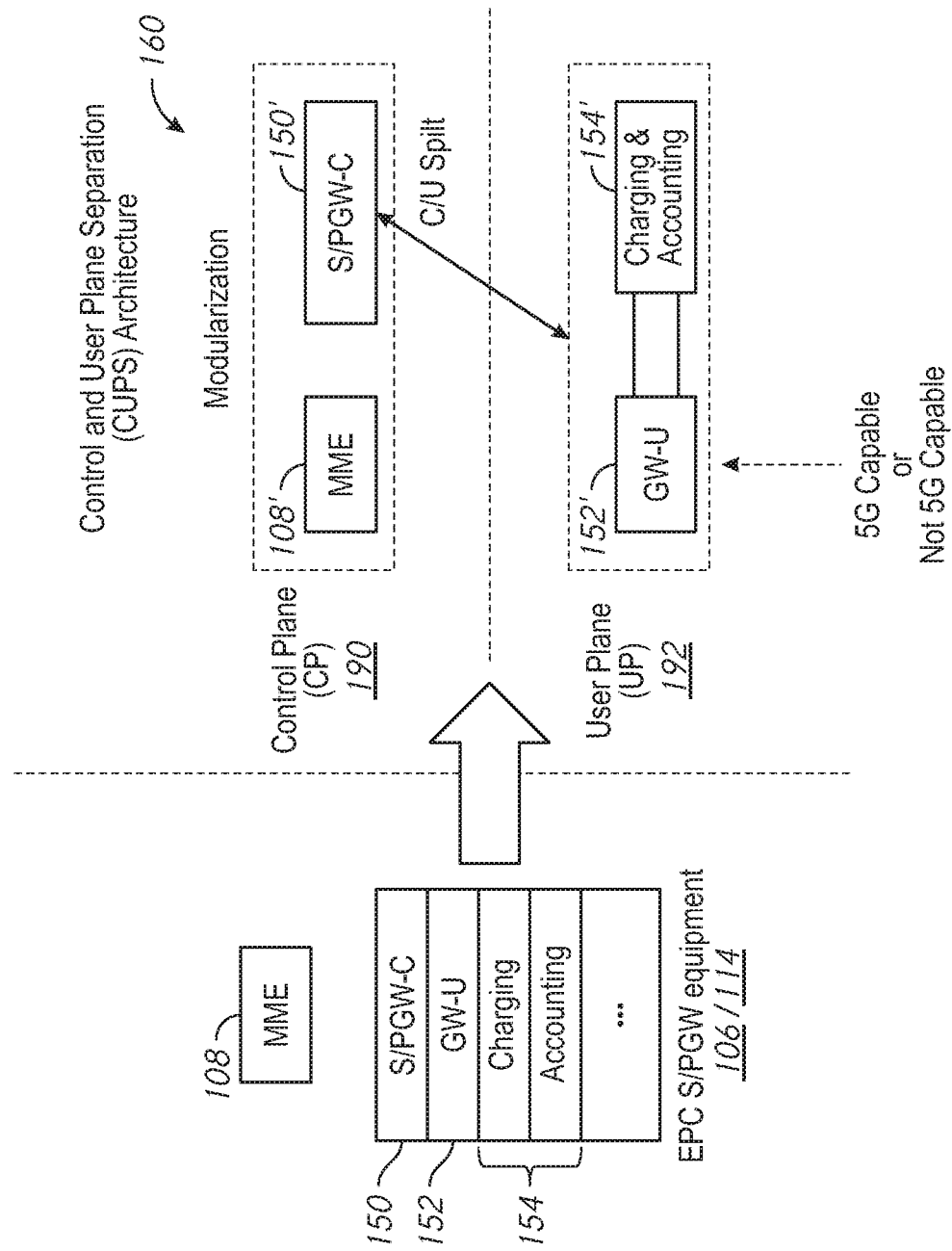
FIG. 1B is an illustrative representation of a portion of the network architecture of FIG. 1A, where a control and user plane separation (CUPS) architecture may be employed.

The mobile network of FIG. 1A may be configured with a control and user plane separation (CUPS) architecture 160 which is conceptually illustrated on the right-hand side of FIG. 1B. The left-hand side of FIG. 1B illustrates the network architecture without CUPS, showing MME 108 and collocated S/PGW equipment 106/114 which may include a S/PGW CP (S/PGW-C) 150, a GW-U 152, and service point functionality 154 for charging and accounting. The right-hand side of FIG. 1B which illustrates CUPS architecture 160 provides a modularization and separation of control plane (CP) 190 and user plane (UP) 192 (i.e. a C/U "split"). With CUPS architecture 160, an MME 108' and S/PGW-C 150' of the CP 190 are separated from a GW-U 152' and service point functionality 154' (the UP 192).

The evolution of modern cellular communications has been marked by a series of technology generations. With the 4G based networks now widely deployed, the industry has turned its sights on "the next big thing"—5G networks. The initial deployments of 5G services are expected to be based on a Non-Standalone (NSA) architecture, which is essentially an interworking of a 5G "new radio" (5G-NR or just "NR") with the existing 4G core (see e.g. FIGS. 1A-1B).

Figure 2:
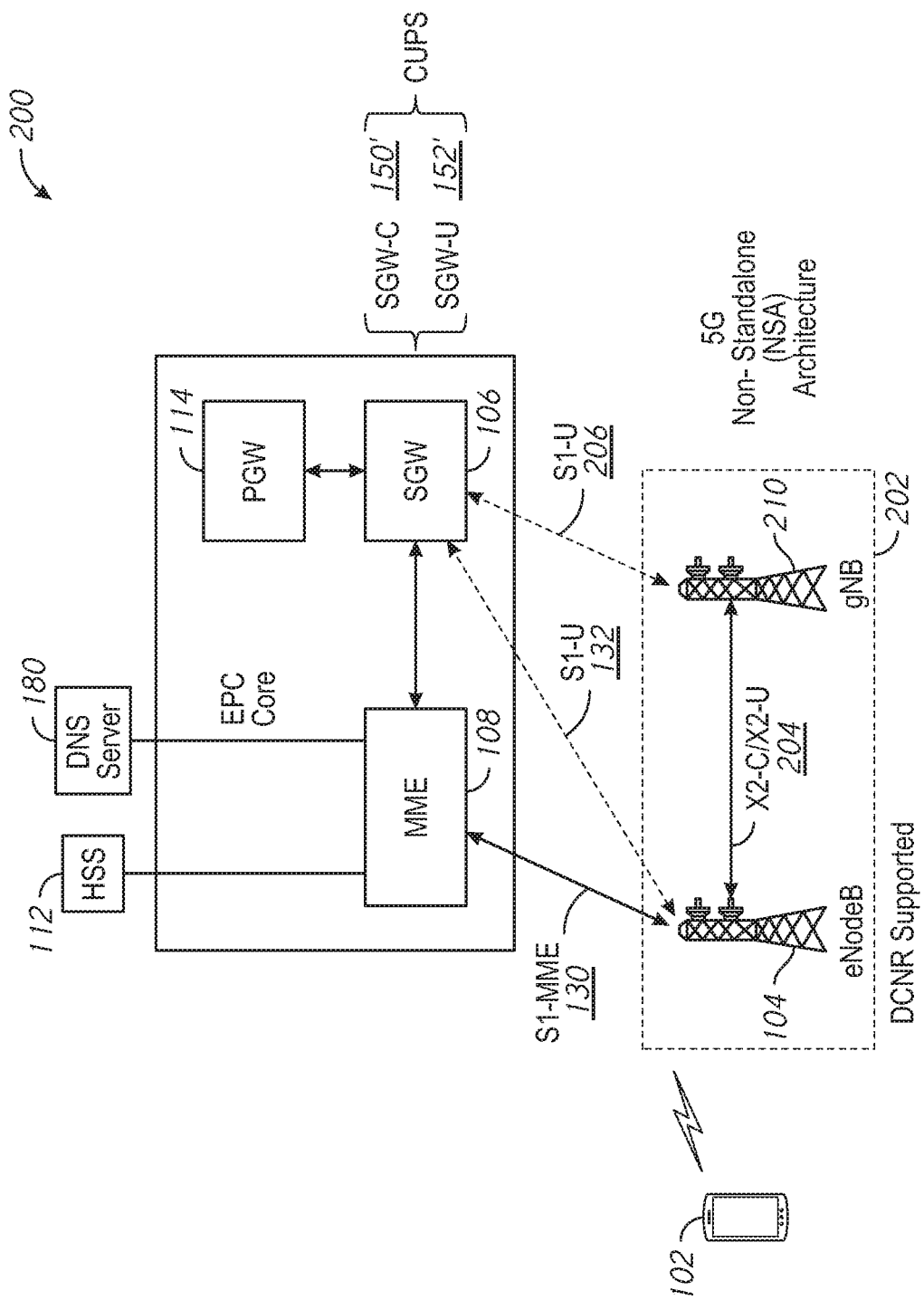
FIG. 2 is an illustrative representation of a portion of the network architecture of FIGS. 1A-1B, showing a 5G Non-Standalone (NSA) architecture deployment in the mobile network, where an eNodeB (eNB) is configured to support Dual Connectivity with New Radio (DCNR) to facilitate communication of 5G user plane traffic in the mobile network of FIGS. 1A-1B and 2.

To illustrate, FIG. 2 is an illustrative representation of a portion of the network architecture of FIGS. 1A-1B, where a 5G NSA architecture deployment 200 is utilized. Here, eNB 104 is configured to support Dual Connectivity with New Radio (DCNR), being connected to a gNB 210 (i.e. 5G NR) via an X2 interface 204. The CP or S1-MME interface 130 to MME 108 is from the eNB 104 (also called a Master eNB or MeNB). For the UP, the S1-U interface 132 between eNB 104 and SGW 106 is utilized; for 5G bearers, an S1-U interface 206 between gNB 210 (i.e. the 5G NR) and SGW 106 is utilized. Note that the EPC core (which includes MME 108, SGW 106, and PGW 114) may not even be aware of the existence of the gNB 210 in the mobile network.

Figure 3:
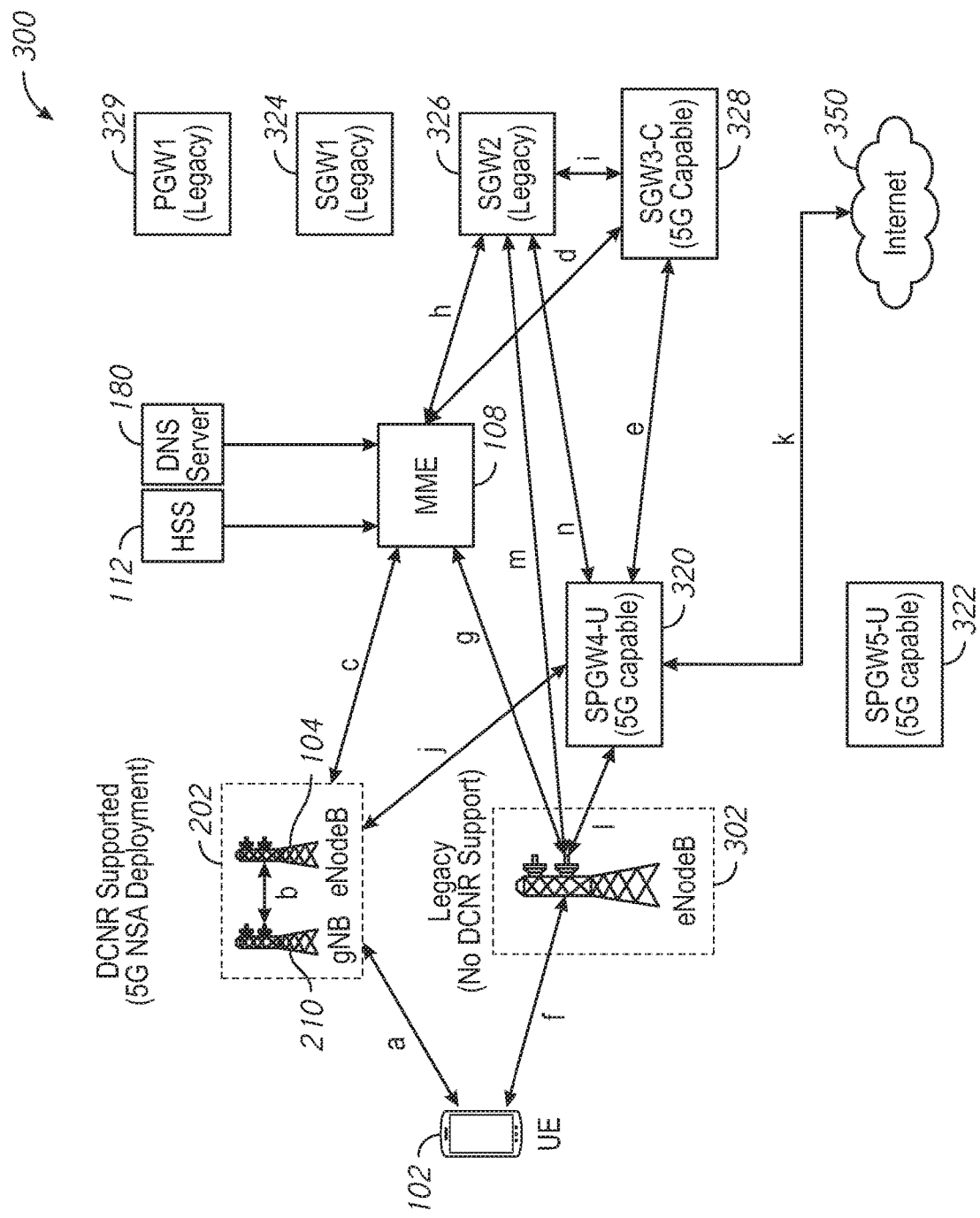
FIG. 3 is an illustrative representation of an example deployment of the network architecture described in relation to FIGS. 1A-1B and 2, for use in describing issues or concerns that may arise in such a mobile network.

FIG. 3 is an illustrative representation of an example deployment arrangement 300 of the network architecture described in relation to FIGS. 1A-1B and 2, for use in describing issues or concerns that may arise in (at least initial) 5G NSA deployments of the mobile network.

In the example deployment arrangement 300 of FIG. 3, the mobile network may have a legacy EPC core which includes eNB 104, MME 108, and various SGWs and PGWs. The operator of the mobile network may wish to expand the legacy EPC core to accommodate 5G services, based on 5G NSA architecture 202. The operator may deploy new core nodes with CUPS architecture, where UP nodes are located near the edge of network to achieve higher 5G speeds. In the deployment, the various SGWs and PGWs as shown in FIG. 3 may include a SGW 324 which is a legacy (4G) node, a SGW 326 which is a legacy (4G) node, a S/GW-C 328 which is 5G-capable, a S/PGW-U 320 which is 5G-capable, S/PGW-U 322 which is 5G-capable, and a PGW 329 which is a legacy (4G) node. Signaling paths between the network entities may include the various signal paths indicated with the lettering "a" through "n" as depicted in FIG. 3.

Consider the case where UE 102 itself is 5G/DCNR capable and has a valid 5G subscription. UE 102 may perform an initial attach via legacy eNB 302 or 5G DCNR capable eNB 104. At MME 108, the UE capability and UE subscription are identified and therefore the 5G-capable S/PGW-C 328 may be selected for use in a session. In turn, S/PGW-C 328 may select the 5G-capable S/PGW-U 320. The established control signaling path may be as follows: f, g, d, and e; the established data path may be as follows: f, l, and k. As is apparent, when UE 102 is attached via eNB 302 where high speed 5G data services are not possible, the selected network resources used are 5G. This is an inefficient use of network resources that could be used for other UEs.

According to some implementations of the present disclosure, methods and apparatus for use in more optimally selecting SGW for a session of a UE in a mobile network having 5G NSA architecture deployments are provided. The methods and apparatus of the present disclosure may provide for a more optimal assignment and utilization of (e.g. potentially limited) 5G network resources in the mobile network having 5G NSA architecture deployments. In at least some implementations, the present techniques may enable the operator to more suitably allocate computing and storage resources for SGWs with better accuracy and therefore save unnecessary capital investment.

In some implementations, an eNB capability advertisement may be provided from an eNB. Typically, an S1 Setup procedure is performed between an eNB and an MME when the eNB first establishes a connection with the MME. The eNB may initiate the procedure by sending an S1 SETUP REQUEST message which includes appropriate data to the MME. The MME responds with a S1 SETUP RESPONSE message which includes appropriate data. The exchanged data may be stored at the respective node and used for the duration of the association. When the procedure is finished, the S1-MME interface is operational and other S1-MME messages may be exchanged.

According to some implementations of the present disclosure, a DCNR support indication may be added in the S1 SETUP REQUEST message, where the eNB indicates its capability to facilitate a 5G NR bearer setup. Specifically, for example, the newly-proposed information element (IE) may be an enumerated attribute having two possible values—(1) DCNR_SUPPORTED; and (2) DCNR_NOT_SUPPORTED. The eNB may set a value of DCNR_SUPPORTED for this IE during 51 SETUP procedure if it has or detects X2 connectivity with a 5G NR/gNB and supports 5G NSA procedures. The MME may store this information in association with an identity of the eNB, for subsequent use as a criterion in SGW selection for a session of a UE served by the eNB.

In some implementations, the DCNR support indication IE may also be added to an eNB Configuration Update message, as a DCNR Capability Indication IE. The eNB may appropriately set this IE in event that the DCNR support on the eNB has been dynamically changed. When received, the MME may update the stored information associated with the eNB.

Figure 4A:
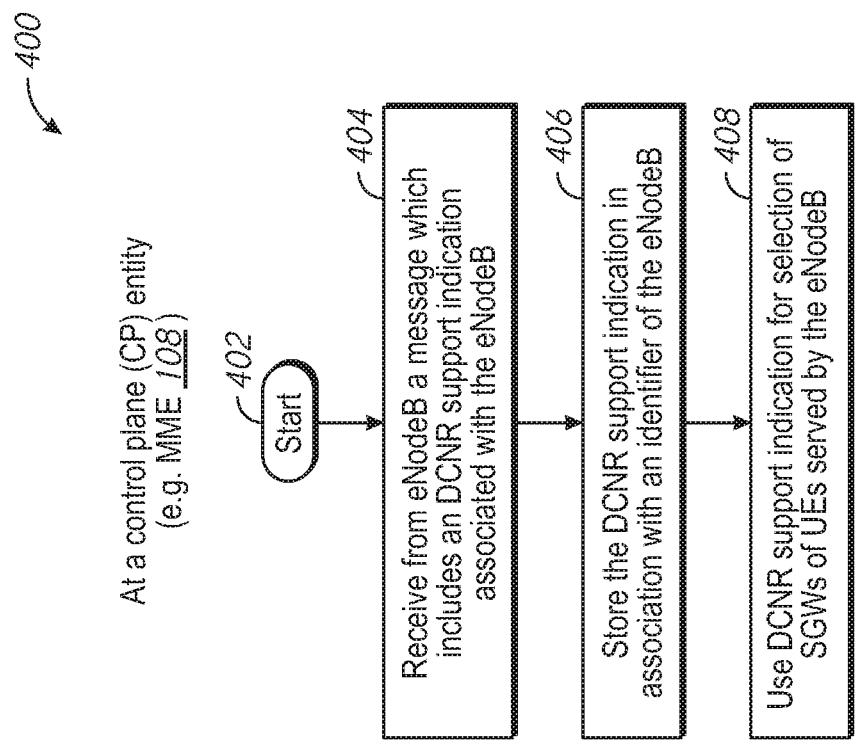
FIG. 4A is a flowchart for describing a method of receiving and storing configuration information of eNBs in the mobile network described in relation to FIGS. 1A-1B and 2 according to some implementations of the present disclosure, which may be for use in selecting a serving gateway (SGW) for a session of a UE in the mobile network having 5G NSA architecture deployments.

FIG. 4A is flowchart 400 for describing a method for use in selecting a SGW for a session of a UE in a mobile network as described in relation to FIGS. 1A-1B and 2, according to some implementations of the present disclosure. The method may be performed by one or more controllers or network equipment of a control plane (CP) entity (e.g. an MME). The method may be embodied as a computer program product including a non-transitory computer readable medium and instructions stored in the computer readable medium where the instructions are executable on one or more processors for performing the steps of the method.

Beginning at a start block 402 of the flowchart 400 of FIG. 4A, the controller of the CP entity may receive, from an eNB, a setup request message (step 404 of FIG. 4A). The setup request message may include an indication which indicates whether the eNB is configured to support DCNR (step 404 of FIG. 4A). The indication may be a DCNR support indication. The eNB may be configured with support of DCNR or without support of DCNR. The controller may cause the indication to be stored, in association with an identification of the eNB, in memory (step 406 of FIG. 4A). The DCNR support indication may be used as a criterion in the selective assignment of one of a plurality of SGWs for a session of a UE served by the eNB (step 408 of FIG. 4A).

Note that steps 404, 406, and 408 of FIG. 4A may be performed for each one of a plurality of eNBs in the mobile network. Here, the memory may be part of a database (DB), where DCNR support indications for the eNBs are stored in association with their respective eNB identifications and any other eNB information. In the selection of a SGW for a UE, the controller of the CP entity may receive an identification of an eNB which serves the UE in the mobile network, retrieve from the memory the stored indication (e.g. the DCNR support indication) that is stored in association with the stored identification of the eNB, and use the retrieved indication as a criterion in the selection of one of a plurality of SGWs for the session of the UE.

Figure 4B:
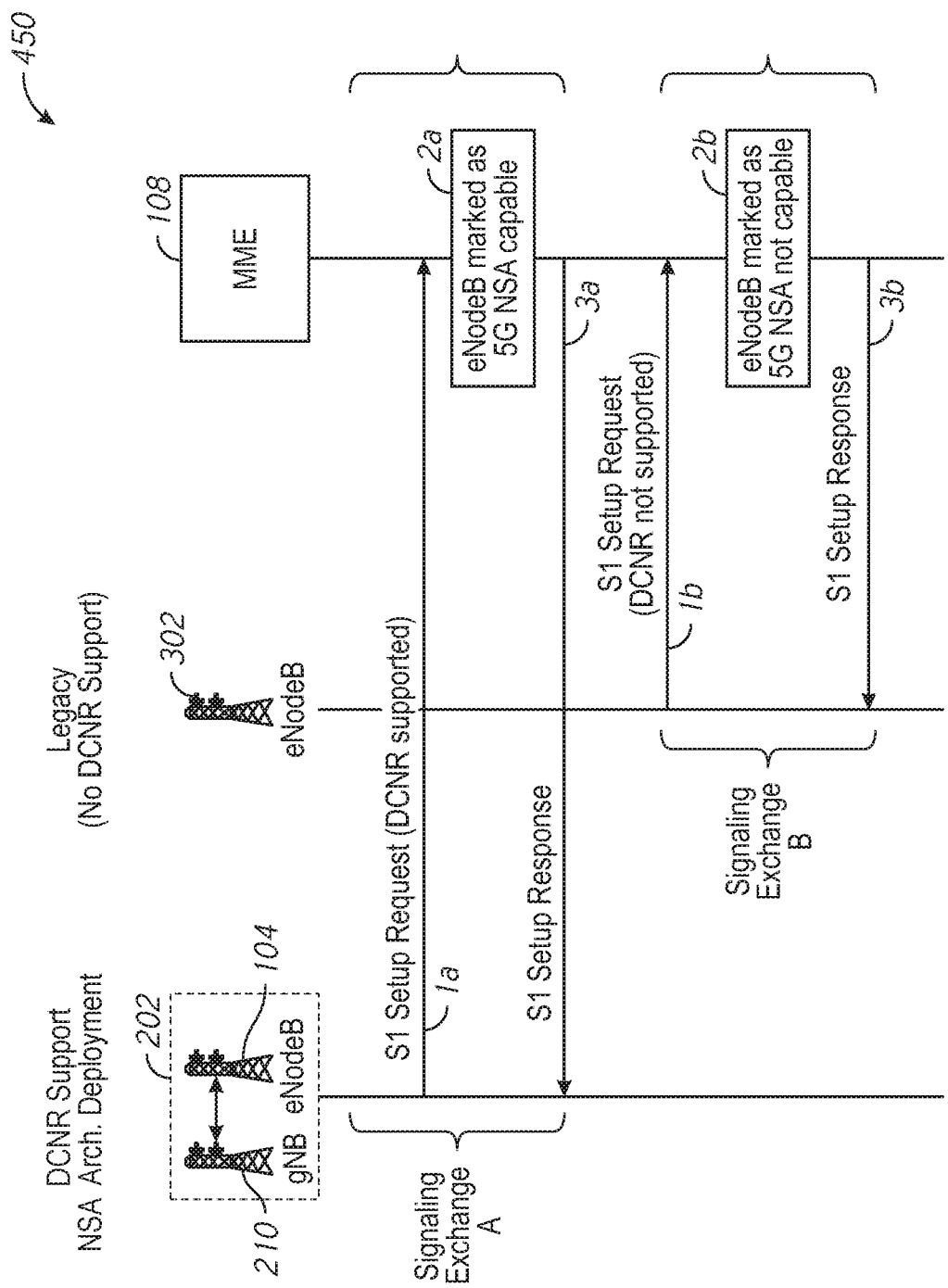
FIG. 4B is a process flow diagram for describing a method of receiving and storing configuration information of eNBs in the mobile network described in relation to FIGS. 1A-1B and 2 according to some implementations of the present disclosure, which corresponds to the method of FIG. 4A, and which may be for use in selecting a SGW for a session of a UE in the mobile network having 5G NSA architecture deployments.

FIG. 4B is a process flow diagram 450 of the method corresponding to the method of FIG. 4A. As illustrated in FIG. 4B, eNB 104 is configured to support DCNR for the 5G NSA deployment 202, being connected to gNB 210 (5G NR) via an X2 interface. A signaling exchange "A" between eNB 104 and MME 108 is illustrated. In the signaling exchange "A", eNB 104 may send a S1 Setup Request message to MME 108 (step 1a of FIG. 4B). The S1 Setup Request message may include an indication which indicates whether eNB 104 is configured to support DCNR. Here, the indication may indicate that eNB 104 is configured to support DCNR. MME 108 may receive the S1 Setup Request message from eNB 104 and, in response, store the indication, in association with an identification of eNB 104, in memory (step 2a of FIG. 4B). MME 108 may send a S1 Setup Response message to eNB 104 (step 3a of FIG. 4B).

As further illustrated in FIG. 4B, eNB 302 is configured without support of DCNR, having no connection to any gNB or 5G NR. A signaling exchange "B" between eNB 302 and MME 108 is illustrated. In the signaling exchange "B", eNB 302 may send a S1 Setup Request message to MME 108 (step 1b of FIG. 4B). The S1 Setup Request message may include an indication which indicates whether eNB 302 is configured to support DCNR. Here, the indication may indicate that eNB 302 is configured without support of DCNR. MME 108 may receive the S1 Setup Request message from the eNB 302 and, in response, store the indication, in association with an identification of the eNB 302, in the memory (step 2b of FIG. 4B). MME 108 may send a S1 Setup Response message to eNB 302 in response (step 3b of FIG. 4B).

In some implementations, an eNB configured to support DCNR is configured to send a message which includes a DCNR support indication, but an (legacy) eNB configured without support of DCNR is configured to send a message which fails to include any DCNR support indication. Here, legacy eNBs need not be upgraded to send any such special indications.

Figure 5A:
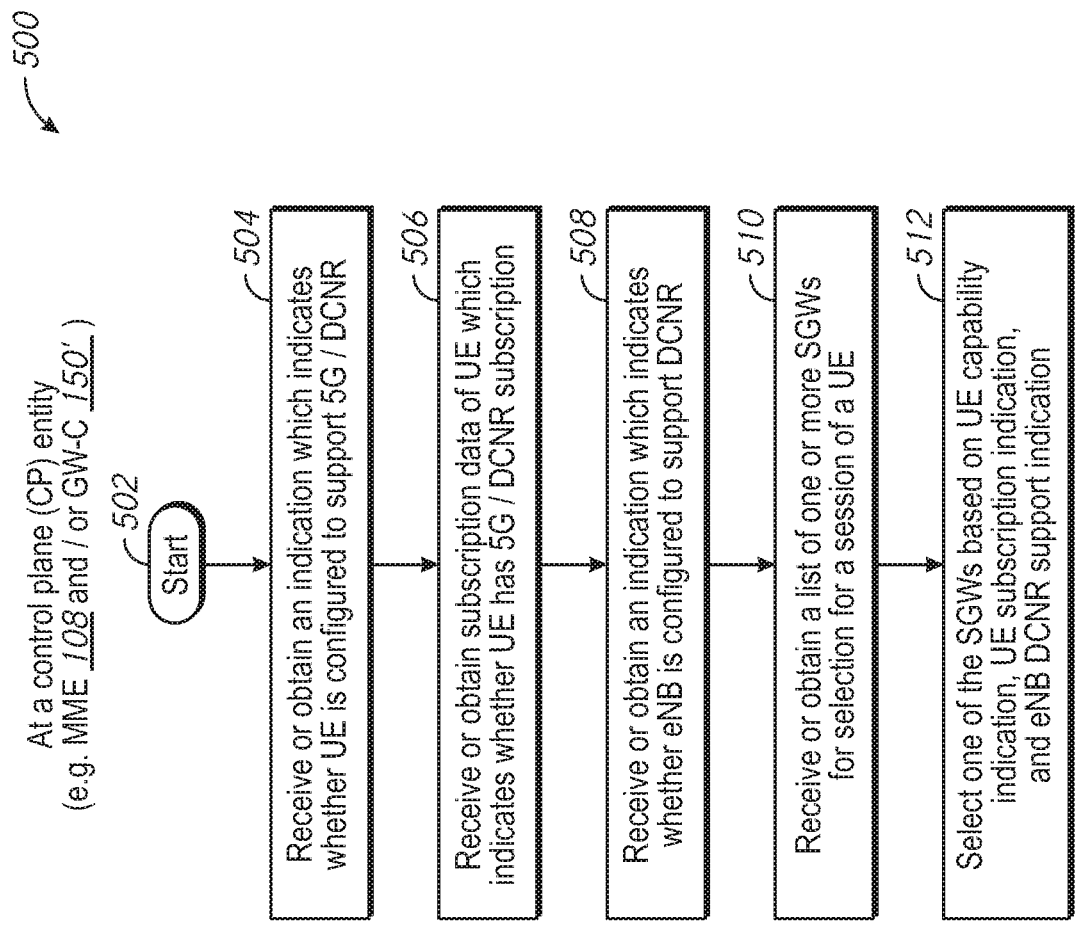
FIG. 5A is a flowchart for describing a method for use in selecting a SGW for a session of a UE in the mobile network described in relation to FIGS. 1A-1B and 2 according to some implementations of the present disclosure.
Figure 5B:
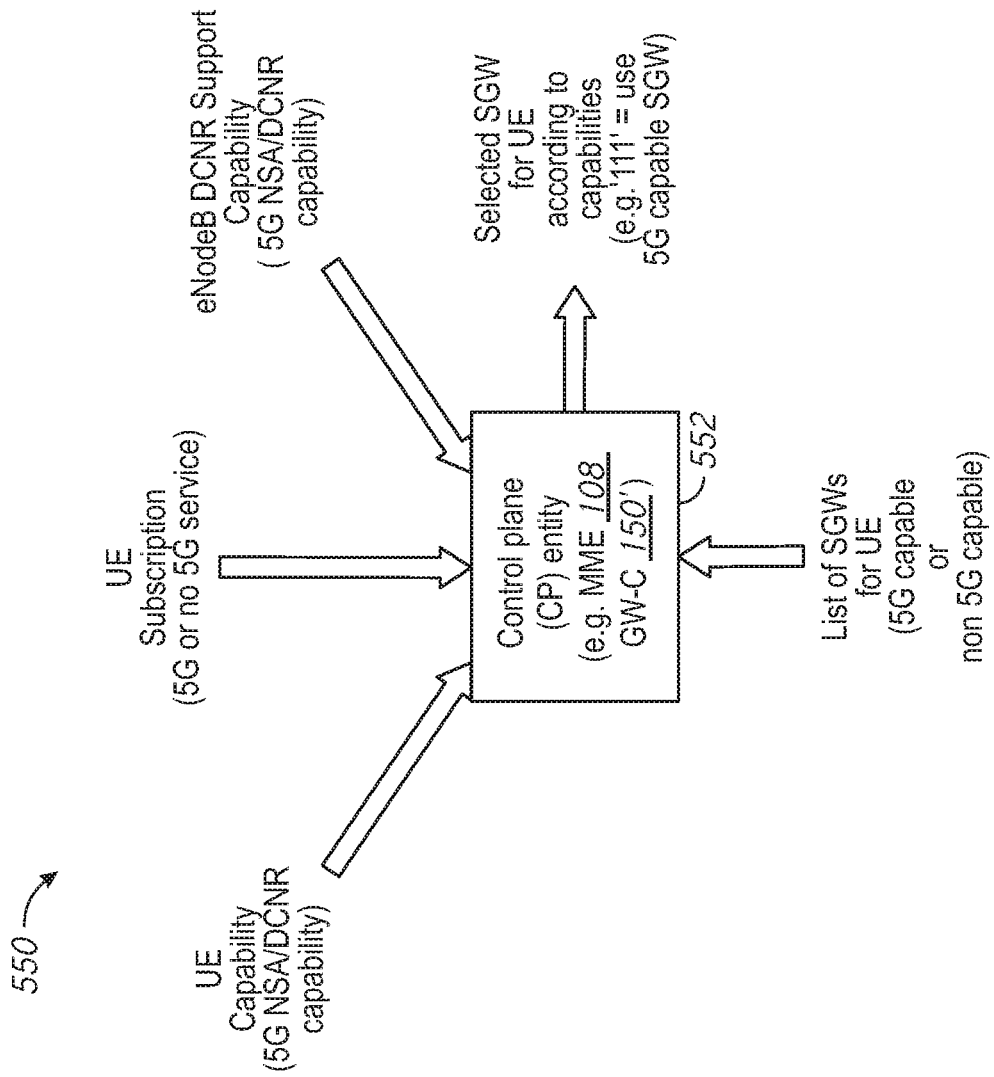
FIG. 5B is a data flow diagram for visually illustrating the method of FIG. 5A.

FIG. 5A is a flowchart 500 for describing a method for use in selecting a SGW for a session of a UE in the mobile network described in relation to FIGS. 1A-1B and 2 according to some implementations of the present disclosure. FIG. 5B is a data flow diagram 550 which visually illustrates the method of FIG. 5A. The method may be performed by one or more controllers or network equipment of a CP entity (e.g. an MME). The method may be embodied as a computer program product including a non-transitory computer readable medium and instructions stored in the computer readable medium where the instructions are executable on one or more processors for performing the steps of the method.

Beginning at a start block 502 of FIG. 5A, the controller of the CP entity may receive or obtain an indication which indicates whether a UE is configured to support 5G/DCNR (step 504 of FIG. 5A). The controller may also receive or obtain subscription data of the UE which indicates whether the UE has a 5G/DCNR subscription (step 506 of FIG. 5A). The controller may also receive or obtain an indication which indicates whether an eNB serving the UE is configured to support DCNR (step 508 of FIG. 5A). Further, the controller may receive or obtain a list of one or more SGWs for potential use in a session of the UE (step 510 of FIG. 5A). The controller may select one of the SGWs for use in the session of the UE based on the UE capability indication of step 504, the UE subscription data of step 506, and the eNB DCNR support indication of step 508 (step 512 of FIG. 5A). As a simple illustrative example, when the eNB DCNR support indication indicates that the eNB is configured to support DCNR, and the UE capability indication and UE subscription data indicate 5G, a 5G-capable SGW may be selected but otherwise a legacy (non-5G) SGW may be selected.

Figure 6A:
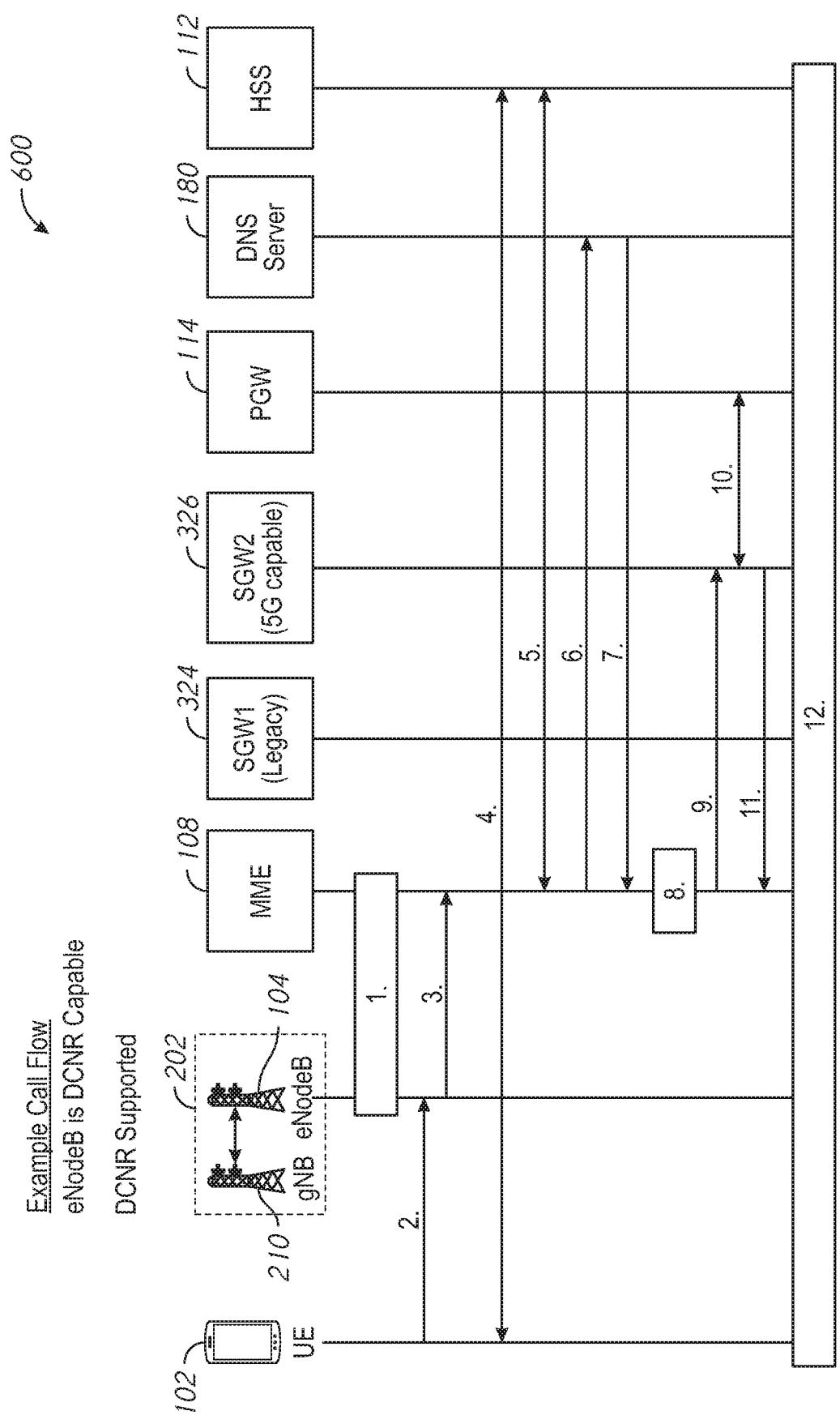
FIG. 6A is a message flow diagram for describing a method for use in selecting a SGW for a session of a UE in a mobile network having 5G NSA architecture deployments according to some implementations of the present disclosure, where the eNB of the mobile network is configured to support DCNR.

FIG. 6A is a message flow diagram 600 for describing a method for use in selecting a SGW for a session of a UE in a mobile network having 5G NSA architecture deployments according to some implementations of the present disclosure. In the method of FIG. 6A, eNB 104 will serve the 5G-capable UE 102 and is configured to support DCNR for the 5G NSA architecture deployment 202.

In FIG. 6A, eNB 104 may establish an S1 association with MME 108 and indicate DCNR_SUPPORTED in the DCNR Support Indication IE (step 1 of FIG. 6A). Upon receipt, MME 108 may register eNB 104 as 5G NSA capable. UE 102 may send an Attach Request to eNB 104 (step 2 of FIG. 6A). In the Attach Request message, UE 102 may set a DCNR Supported bit in UE Network Capability to indicate its capability to support 5G NSA. The Attach Request message may be forwarded to MME 108 (step 3 of FIG. 6A), where MME 108 marks the UE capability as 5G/DCNR capable. UE 102 and MME 108 may then perform and complete authentication and security procedures (step 4 of FIG. 6A). MME 108 may send to HSS 112 an Update Location Request (ULR) message to retrieve subscription data for UE 102 based on a UE ID (e.g. the IMSI) (step 5 of FIG. 6A). The retrieved subscription data in an Update Location Answer (ULA) message may indicate that the subscriber of UE 102 is authorized to use 5G services.

MME 108 may send a DNS Name Authority Pointer (NAPTR) query to DNS 180 (step 6 of FIG. 6A) for retrieving a list of a plurality of SGW-Cs which serve a traffic area of UE 102 (step 7 of FIG. 6A). The list may include both SGW 324 which is not 5G-capable (i.e. a legacy SGW) and SGW 326 which is 5G-capable. MME 108 may select one of the plurality of SGW-Cs based on information which includes the eNB DCNR Support Indication, the UE Network Capability, and the UE subscription data (step 8 of FIG. 6A). Here, the MME 108 may select the 5G-capable SGW-C 326, since the DCNR Support Indication indicates that eNB 104 is configured to support DCNR.

MME 108 may then send a message indicating a Create Session Request to this selected SGW-C 326 (step 9 of FIG. 6A). MME 108 may include the information for SGW selection (e.g. the 5G capability information) in this message. The information will assist SGW-C 326 in the selection of one of a plurality of SGW-Us in the CUPS environment for the session of UE 102. Here, the selected SGW-U may be a SGW-U that is configured to support 5G/DCNR. SGW 326 may initiate a Create Session Request towards PGW 114 and, in response, receive a message which indicates a successful setup of the session at PGW 114 (step 10 of FIG. 6A). SGW 326 may then send back a Create Session Response to MME 108 (step 11 of FIG. 6A). Remaining steps from the initial attach call flow of section 5.3.2.1 of 3GPP Specification 23.401 may be followed to complete the session establishment for the session, as one ordinarily skilled in the art will readily appreciate (step 12 of FIG. 6A).

Figure 6B:
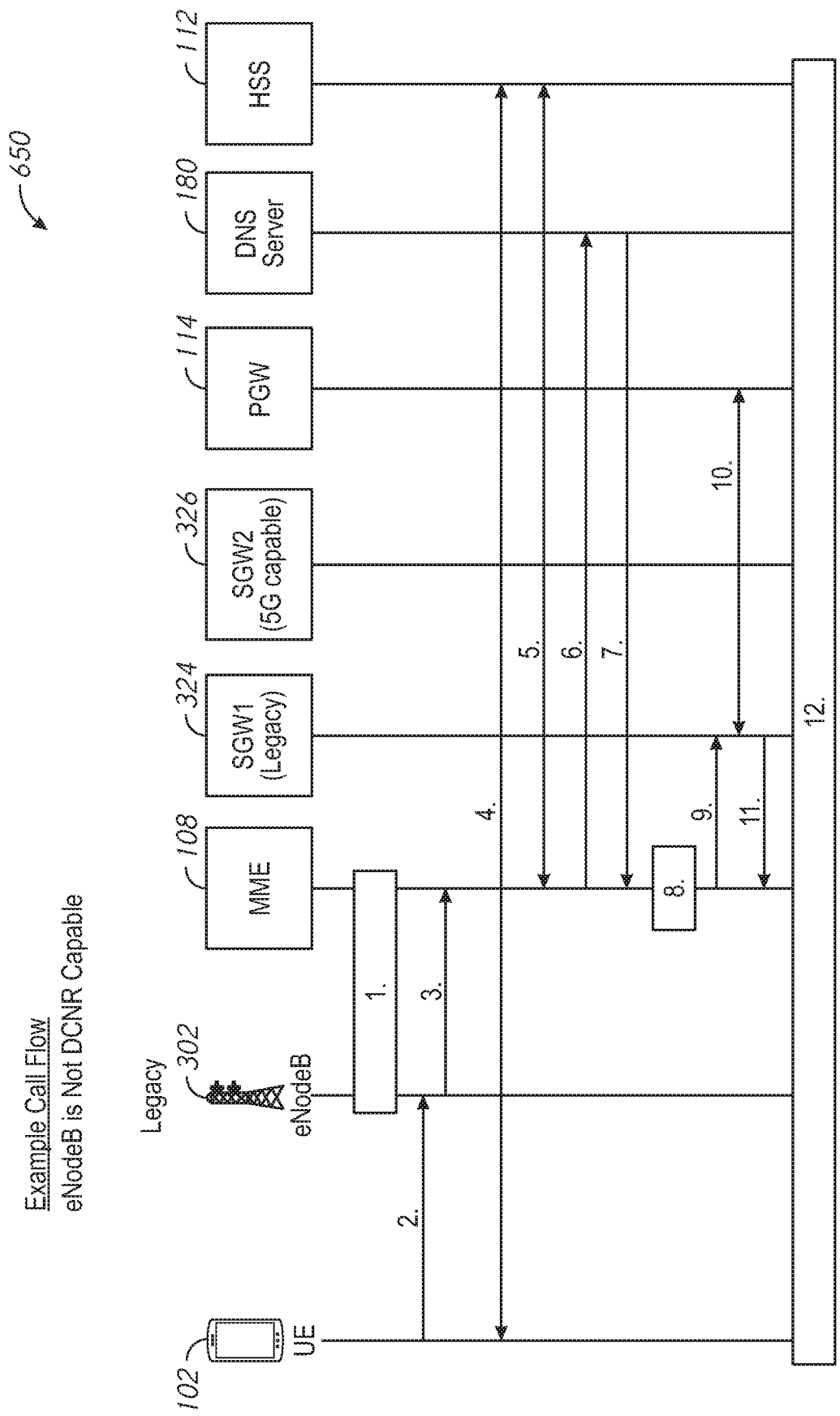
FIG. 6B is a message flow diagram for describing a method for use in selecting a SGW for a session of a UE in a mobile network having 5G NSA architecture deployments according to some implementations of the present disclosure, where the eNB of the mobile network is configured without support of DCNR.

FIG. 6B is a message flow diagram 650 for describing a method for use in selecting a SGW for a session of a UE in a mobile network having 5G NSA architecture deployments according to some implementations of the present disclosure. In the method of FIG. 6B, "legacy" eNB 302 will serve the 5G-capable UE 102 but is configured without support of DCNR.

In FIG. 6B, eNB 302 may establish an S1 association with MME 108 and indicate DCNR_NOT_SUPPORTED in the DCNR Support Indication IE (step 1 of FIG. 6B). Upon receipt, MME 108 may register the eNB 104 as not 5G NSA capable. UE 102 may send an Attach Request to eNB 104 (step 2 of FIG. 6B). In the Attach Request message, UE 102 may set the DCNR Supported bit in the UE Network Capability to indicate its capability to support 5G NSA. The Attach Request message may be forwarded to MME 108 (step 3 of FIG. 6B), where MME 108 marks the UE capability as DCNR capable. UE 102 and MME 108 may then perform and complete authentication and security procedures (step 4 of FIG. 6B). MME 108 may send to HSS 112 a ULR message to retrieve subscription data for UE 102 based on a UE ID (e.g. the IMSI) (step 5 of FIG. 6B). The retrieved subscription data in an ULA message may indicate that the subscriber of UE 102 is authorized to use 5G services.

MME 108 may send a DNS NAPTR query to DNS 180 (step 6 of FIG. 6B) for retrieving a list of a plurality of SGW-Cs which serve a traffic area of UE 102 (step 7 of FIG. 6B). The list may include both SGW 324 which is not 5G-capable and SGW 326 which is 5G-capable. MME 108 may select one of the plurality of SGW-Cs based on information which includes the eNB DCNR Support Indication, the UE Network Capability, and the UE subscription data (step 8 of FIG. 6B). Here, the MME 108 may select the legacy, 4G SGW-C 324, since the DCNR Support Indication indicates that eNB 302 is configured without support of DCNR.

MME 108 may then send a Create Session Request to the selected SGW-C 324 (step 9 of FIG. 6B). MME 108 may further include the information for SGW selection (e.g. the non-5G capability information) in this message. The information will assist the selected SGW-C 324 in the selection of one of a plurality of SGW-Us in the CUPS environment for the session of UE 102. Here selected SGW-U may be a SGW-U that is without support of 5G/DCNR, and may be 4G-specific. SGW 324 may initiate a Create Session Request towards PGW 114 and, in response, receive a message which indicates a successful setup of the session at PGW 114 (step 10 of FIG. 6B). SGW 324 may then send back a Create Session Response to MME 108 (step 11 of FIG. 6B). Remaining steps from the initial attach call flow of section 5.3.2.1 of 3GPP Specification 23.401 may then be followed to complete the session establishment for the session, as one ordinarily skilled in the art will readily appreciate (step 12 of FIG. 6B).

As is apparent from the use-case described in relation to FIG. 6B, even though UE 102 and its subscription data indicated support for 5G NSA, the legacy (4G) SGW 324 was selected for the session of UE 102 since eNB 302 is configured without support of 5G NSA. Without the techniques of the present disclosure, MME 108 would have selected 5G-capable SGW 326, unnecessarily utilizing precious (e.g. limited) 5G resources in the mobile network.

The techniques of the present disclosure may further be utilized in a SGW reselection and/or relocation to a more optimal node, as will now be described in relation to FIGS. 7A-7B. An SGW/SGW-C relocation from a 5G-capable SGW/SGW-C to a legacy SGW/SGW-C, or vice versa, may be performed in any one of the following situations: a UE being served by a 5G NSA capable eNB is handed over to a legacy 4G eNB; a UE being served by a legacy eNB is handed over to a 5G-capable eNB; a 5G NSA capable eNB sends a eNB Configuration Update message to MME 108, indicating a change in the 5G NSA capability of the eNB; and a legacy eNB is dynamically changed to support 5G NSA and sends an eNB Configuration Update message to MME 108, indicating a change in the 5G NSA capability of the eNB.

Figure 7A:
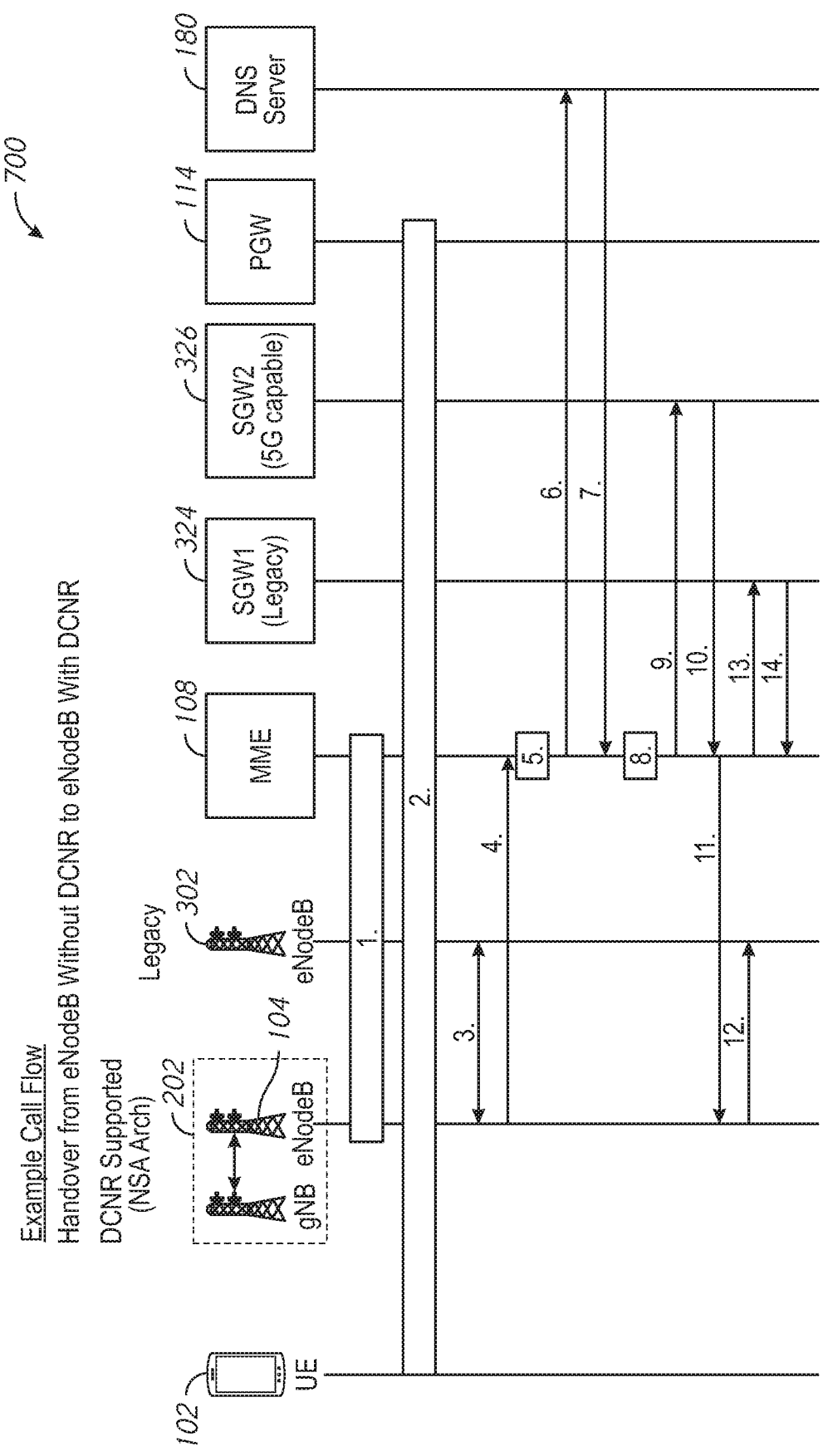
FIG. 7A is a message flow diagram for describing a method for use in selecting a SGW for a session of a UE in a mobile network having 5G NSA architecture deployments according to some implementations of the present disclosure, where the session of the UE served by a source eNB configured without support of DCNR is handed over to a target eNB configured with support of DCNR.

FIG. 7A is a message flow diagram 700 for describing a method for use in selecting a SGW for a session of a UE in a mobile network having 5G NSA architecture deployments according to some implementations of the present disclosure. In FIG. 7A, a session of 5G-capable UE 102 served by a source eNB (i.e. eNB 302) configured without support of DCNR is handed over to a target eNB (i.e. eNB 104) configured to support DCNR.

In FIG. 7A, legacy eNB 302 and DCNR-capable eNB 104 are associated with MME 108 and have published their DCNR capability (step 1 of FIG. 7A). The 5G-capable UE 102 with a 5G subscription has a session established with eNB 302 (step 2 of FIG. 7A), where legacy SGW 324 is used. Subsequently, UE 102 is relocated, such that a handover of the session of UE 102 is initiated. The session of UE 102 may be handed over from legacy eNB 302 (the source eNB) to 5G NSA capable eNB 104 (the target eNB). Handoff preparation phase and data forwarding may be established between the eNBs 104 and 302 (step 3 of FIG. 7A). The (target) eNB 104 may send a Path switch request to MME 108 (step 4 of FIG. 7A). Since MME 108 knows that (target) eNB 104 is 5G NSA capable and the current session is established with (legacy) SGW 324, MME 108 may trigger SGW relocation even though the new traffic area is supported by the current legacy SGW 324 (step 5 of FIG. 7A). Here, MME 108 may send a DNS NAPTR query to DNS 180 (step 6 of FIG. 7A) for retrieving a list of a plurality of SGW-Cs which serve a traffic area of UE 102 (step 7 of FIG. 7A). The list may include SGW 324 which is not 5G-capable and SGW 326 which is 5G-capable. MME 108 may select one of the plurality of SGW-Cs based on information which includes the DCNR Support Indication, the UE Network Capability, and the UE subscription data (step 8 of FIG. 7A). Here, MME 108 will select SGW 326 configured to support 5G for the session of UE 102.

MME 108 may send a Create Session Request to this selected SGW 326 (step 9 of FIG. 7A). MME 108 may include the information for SGW selection (e.g. the 5G capability information) in this message. The information will assist SGW-C 326 in the selection of one of a plurality of SGW-Us in the CUPS environment for the session of UE 102 (i.e. a 5G-capable SGW-U). In response, the SGW 326 may sent to MME 108 a Create Session Response which indicates a successful setup of the session (step 10 of FIG. 7A). SGW 326 may send a Modify Bearer Request to the PGW 114 and, after a response from PGW 114, may send back a Create Session Response to MME 108. MME 108 may send a Path Switch Acknowledgement to (target) eNB 104 (step 11 of FIG. 7A). The (target) eNB 104 may send a Release Resource command to (source) eNB 302 (step 12 of FIG. 7A). MME 108 may initiate a Delete Session Request to the (source) SGW 326 with a handoff indicator set. In response, the (source) SGW 324 may delete the session and send back a Delete Session Response (step 14 of FIG. 7A).

Figure 7B:
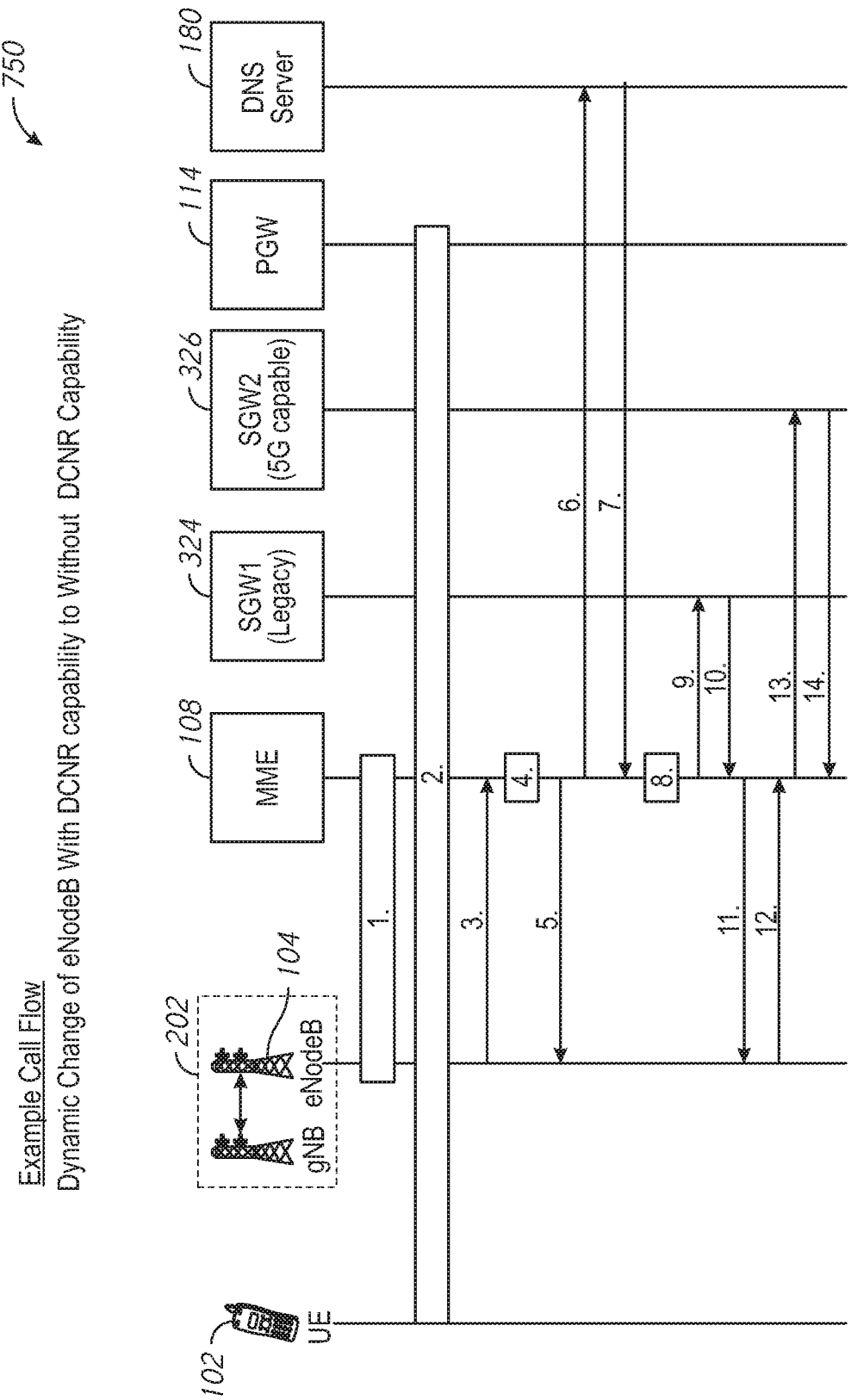
FIG. 7B is a message flow diagram for describing a method for use in selecting a SGW for a session of a UE in a mobile network having 5G NSA architecture deployments according to some implementations of the present disclosure, where the eNB configured with support of DCNR is dynamically changed or provisioned to be without support of DCNR or "disabled"

FIG. 7B is a message flow diagram for describing a method for use in selecting a SGW for a session of a UE in a mobile network having 5G NSA architecture deployments according to some implementations of the present disclosure. In FIG. 7B, eNB 104 configured with support of DCNR is dynamically changed or provisioned to be without support of DCNR (5G "disabled")e.

In FIG. 7B, eNB 104 is associated with MME 108 and has published its capability as 5G NSA capable (step 1 of FIG. 7B). The 5G-capable UE 102 has established a session via eNB 104 (step 2 of FIG. 7B), where 5G-capable SGW 326 is used. Subsequently, the configuration of eNB is dynamically changed, where its 5G NSA capability is disabled. Here, eNB 104 may send to MME 108 an eNB Configuration Update message, which includes the DCNR Capability Indication IE which indicates DCNR_NOT_SUPPORTED (step 3 of FIG. 7B). In response, MME 108 may change the stored 5G NSA capability of eNB 104 to not 5G NSA capable (step 4 of FIG. 7B). MME 108 may respond to the eNB Configuration Update message with an acknowledgement (step 5 of FIG. 7B).

In response, MME 108 may trigger SGW relocation of the session. Here, MME 108 may send a DNS NAPTR query to DNS 180 (step 6 of FIG. 7B) for retrieving a list of a plurality of SGW-Cs which serve a traffic area of UE 102 (step 7 of FIG. 7B). The list may include SGW 324 which is not 5G-capable and SGW 326 which is 5G-capable. MME 108 may select one of the plurality of SGW-Cs based on information which includes the DCNR Support Indication, the UE Network Capability, and the UE subscription data (step 8 of FIG. 7B). Here, MME 108 will select SGW 324 configured without support of 5G for the session of UE 102.

MME 108 may send a Create Session Request to this selected SGW 324 (step 9 of FIG. 7B). MME 108 may include the information for SGW selection (e.g. the not-5G capability information) in this message. The information will assist SGW-C 324 in the selection of one of a plurality of SGW-Us in the CUPS environment for the session of UE 102 (i.e. a legacy, not 5G-capable SGW-U). SGW 324 may send a Modify Bearer Request to the PGW 114 and, after a response from PGW 114, may send back to MME 108 a Create Session Response which indicates a successful setup of the session (step 10 of FIG. 7B). MME 108 may send an E-RAB Modification Request to eNB 104 to update an uplink tunnel endpoint identifier (TEID) received in the Create Session Response from SGW 324 (step 11 of FIG. 7B). eNB 104 may send an E-RAB Modification Response to MME 108 (step 12 of FIG. 7B). MME 108 may initiate a Delete Session Request to the SGW 326 with a handoff indicator set (step 13 of FIG. 7B). In response, SGW 326 may delete the session and send back to MME 108 a Delete Session Response (step 14 of FIG. 7B).

Figure 8:
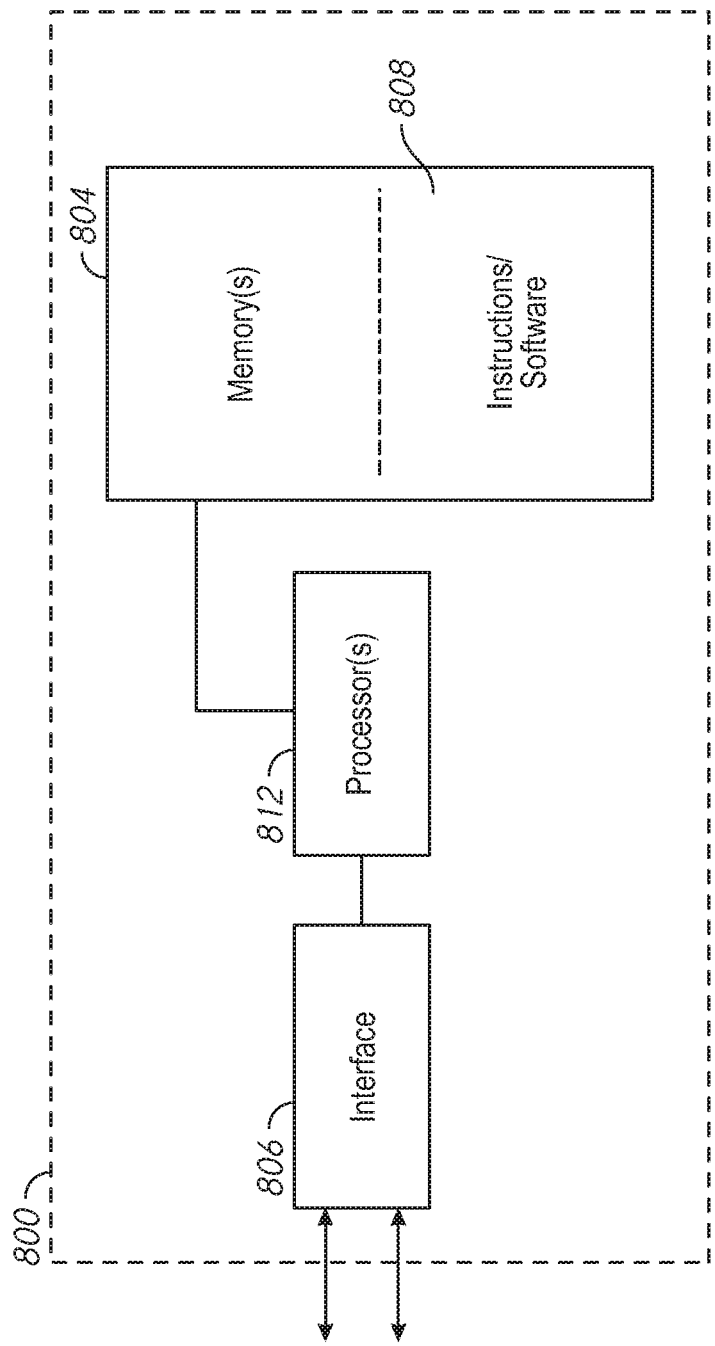
FIG. 8 is an illustrative representation of basic relevant components of a controller, network node, network element, or network equipment of a CP entity for use in a mobile network (e.g. the mobile network of FIGS. 1A-1B and 2) according to some implementations of the present disclosure.

FIG. 8 is an illustrative representation of basic relevant components of a controller, network node, network element, or network equipment in a mobile network (e.g. the mobile network of FIGS. 1A-1B and 2) according to some implementations of the present disclosure. Network equipment 800 may be a control plane (CP) entity or node of the mobile network and, more specifically, a CP entity for mobility management (e.g. an MME, such as MME 108 or 108' of the present disclosure). The components of network equipment 800 may include one or more processors 812 coupled to one or more memories 804 and to one or more interfaces 806. One or more interfaces 806 may be used for communication with one or more other network nodes in the mobile network. Where network equipment 800 is an MME, one or more interfaces 806 may be an S1-MME interface and an S11 interface (see e.g. FIG. 1A). The one or more processors 806 may be configured to operate in accordance with program instructions/software 808 stored in the one or more memories 804, in order to perform basic operations as well as to perform techniques of the present disclosure. Relatedly, a computer program product may include a non-transitory computer-readable medium (e.g. memory, a computer disk, etc.) and program instructions stored in the non-transitory computer-readable medium such that, when executed by one or more processors 812, may perform the techniques of the present disclosure.

As is apparent, having knowledge of the eNB's DCNR support capability for 5G NSA may assist in the selection of an appropriate SGW for a 5G-capable UE with a valid subscription for 5G services. One or more advantages may be realized depending on the implementation. Without the present techniques, a 5G-capable UE with a valid 5G subscription would end up utilizing precious resources in 5G-capable SGW nodes even when connectivity does not support 5G. When a UE moves from a location where 5G NR is present to one where only 4G radio is present, or vice-versa, the techniques of the present disclosure cause a reselection of a SGW per desired network slicing and planning of the operator. Further, 5G support of the eNB may be dynamically changed where sessions may be seamlessly relocated to a more optimal SGW-C/SGW-U. The above-stated relocation may help an operator maintain an optimized usage of network nodes during dynamic changes. During SGW overload conditions, existing sessions may be dropped and/or regulated according to policy; without the present techniques, the SGW may end up deleting/regulating some 5G sessions when several other sessions existing on that SGW can be safely relocated to a legacy 4G SGW. The present technique may enable the operator to better plan and/or pace network expansion and capacity, where 5G SGW capacity may be added and utilized only by 5G subscribers. The network design for 5G network in a CUPS environment becomes more simplified, as there is no need to provide mesh connectivity of SPGW-U nodes to the legacy eNodeBs in order to support handoff from legacy eNB to DCNR-capable eNB (and vice versa).

Thus, methods and apparatus for use in a selecting a SGW for a session of a UE in a mobile network having 5G NSA architecture deployments have been described. Again, the methods and apparatus of the present disclosure may provide for a more optimal assignment and utilization of (e.g. potentially limited, at least initially) 5G network resources in the mobile network. In at least some implementations, the present techniques may enable an operator to suitably allocate computing and storage resources for SGWs with better accuracy and hence save unnecessary (e.g. premature) capital investment.

In one illustrative example, one or more controllers of a control plane (CP) entity for use in a mobile network (e.g. a mobility management entity or "MME") may be configured to receive or obtain an indication which indicates whether an eNB is configured to support DCNR, for a 5G NSA architecture deployment. The one or more controllers may be further configured to select, based on the indication, one of a plurality of SGWs for a session of a UE served by the eNB. Additional information may be used as a basis for the SGW selection, including UE capability and UE subscription data. For example, when the indication indicates that the eNB is configured to support DCNR and the UE capability and subscription data indicate 5G capability, a 5G-capable SGW may be selected but otherwise a legacy (non-5G) SGW may be selected. The steps of the technique may be triggered in response to establishment of a session for the UE, identification of a handover of the session for the UE, or identification of a dynamic change in the configuration of the eNB, as examples. Accordingly, the present techniques may provide for a more optimal assignment and utilization of (e.g. potentially limited) 5G network resources in such mobile networks.

In another illustrative example, one or more controllers of a CP entity for use in a mobile network (e.g. an MME) may be configured may receive, from an eNB, a setup request message which includes an indication which indicates whether the eNB is configured to support DCNR. The one or more controllers may further cause the indication to be stored, in association with an identification of the eNB, in memory. Subsequently, the DCNR support indication may be used as a criterion in a selective assignment of one of a plurality of SGWs for a session of a UE served by the eNB. Note that the above steps may be performed for each one of a plurality of eNBs in the mobile network. Here, the memory may be part of a database (DB), where DCNR support indications for eNBs are stored in association with their respective eNB identifications.

Further, DCNR support of the eNB may dynamically change, where the one or more controllers may be further configured to receive, from the eNB, a configuration update message which includes a DCNR support indication which indicates whether the eNB is configured to support DCNR. The one or more controllers may be further configured to update, in the memory, the DCNR support indication in association with the identification of the eNB.

In some implementations, for the selection of one of the plurality of SGWs, the one or more controllers may receive an identification of an eNB which serves a UE in the mobile network; retrieve, from the memory based on the received identification of the eNB, the stored indication (e.g. the DCNR support indication) that is stored in association with the stored identification of the eNB; and use the retrieved indication to select one of a plurality of SGWs for the session of the UE. Specifically, the one or more controllers may receive or obtain a UE indication which indicates whether the UE is configured to support 5G/DCNR; receive or obtain subscription data for the UE which indicates whether the UE has a 5G/DCNR subscription; and use the retrieved eNB DCNR support indication, the UE capability indication, and the UE subscription data to select one of the plurality of SGWs.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first indication could be termed a second indication, and similarly, a second indication could be termed a first indication, without changing the meaning of the description, so long as all occurrences of the "first indication" are renamed consistently and all occurrences of the "second indication" are renamed consistently. The first indication and the second indication are both indications, but they are not the same indication.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a network element comprising a control plane (CP) entity for mobility management for use in a mobile network,
   receiving, from an eNodeB (eNB), a setup request message for establishing an association with the eNB, the setup request message including an indication which indicates whether the eNB is configured to support Dual Connectivity with New Radio (DCNR) with a connection to a New Radio (NR);
   storing in memory the indication in association with an identification of the eNB;
   receiving a message including an identification of the eNB which is operative to serve a user equipment (UE) in the mobile network;
   retrieving, from the memory based on the identification of the eNB, the indication that is stored in association with the identification of the eNB; and
   selecting one of a plurality of serving gateways (SGWs) for a session of the UE served by the eNB based on the retrieved indication which indicates whether the eNB is configured to support DCNR with the connection to the NR.

2. The method of claim 1, wherein the CP entity for mobility management comprises a mobility management entity (MME), and wherein selecting one of the plurality of SGWs further comprises selecting one of a plurality of SGW CPs (SGW-Cs) for the session of the UE.

3. The method of claim 1, wherein the message comprises an attach request message associated with the UE, the method further comprising:

establishing the association with the eNB prior to receiving the attach request message.

4. The method of claim 2, further comprising:
sending, to the selected SGW-C, a message which provides a corresponding indication which indicates whether the eNB is configured to support DCNR with the connection to the NR, wherein the corresponding indication is used by the selected SGW-C to select one of a plurality of SGW user planes (SGW-Us) for the UE. wherein the message comprises a path switch request for a handover of the UE to the eNB.

5. The method of claim 1, wherein the plurality of SGW-Cs include one or more first SGW-Cs configured to support 5G and one or more second SGW-Cs configured without support of 5G.

6. The method of claim 1, wherein the retrieved indication comprises a first indication, the method further comprising:
at the network element comprising the CP entity for mobility management,
receiving or obtaining a second indication which indicates whether the UE is configured to support 5G/DCNR; and
wherein the selecting further comprises selecting one of the plurality of SGWs based on the first indication which indicates whether the eNB is configured to support DCNR and the second indication which indicates whether the UE is configured to support 5G/DCNR.

7. The method of claim 6, further comprising:
at the network element comprising the CP entity for mobility management,
receiving or obtaining subscription data for the UE which indicates whether the UE has a 5G/DCNR subscription; and
wherein the selecting further comprises selecting one of the plurality of SGWs based on the first indication which indicates whether the eNB is configured to support DCNR, the second indication which indicates whether the UE is configured to support 5G/DCNR, and the subscription data which indicates whether the UE has the 5G/DCNR subscription.

8. The method of claim 7,
wherein the message comprises a path switch request for a handover of the UE to the eNB.

9. The method of claim 1,
wherein the setup request message comprises an S1 setup request message for establishing the association comprising an S1 association over an S1-MME interface of the network element, the method further comprising:
establishing the S1 association with the eNB prior to receiving the message which includes the identification of the eNB.

10. The method of claim 9, further comprising:
at the network element comprising the CP entity for mobility management,
receiving, from the eNB, an eNB configuration update message which includes a DCNR support indication which indicates whether the eNB is configured to support DCNR with the connection to the NR; and
updating, in the memory, the DCNR support indication in association with the identification of the eNB.

11. The method of claim 1, wherein:
when the retrieved indication is indicative that the eNB is configured to support DCNR with the connection to the NR, the selecting of one of the plurality of SGWs further comprises selecting an SGW configured to support 5G capability; and when the retrieved indication is indicative that the eNB is configured without support of DCNR with the connection to the NR, the selecting of one of the plurality of SGWs further comprises selecting an SGW configured without support of the 5G capability.

12. Network equipment of a control plane (CP) entity for mobility management for use in a mobile network, the mobile network comprising:
one or more processors;
one or more interfaces for communication with one or more nodes in the mobile network;
one or more processors being configured to:
receive, from an eNodeB (eNB), a setup request message for establishing an association with the eNB, the setup request message including an indication which indicates whether the eNB is configured to support Dual Connectivity with New Radio (DCNR) with a connection to a New Radio (NR);
store, in a memory, the indication in association with an identification of the eNB;
receive a message including an identification of the eNB which is operative to serve a user equipment (UE) in the mobile network;
retrieve, from the memory based on the identification of the eNB, the indication that is stored in association with the identification of the eNB; and
select one of a plurality of serving gateways (SGWs) for a session of the UE served by the eNB based on the retrieved indication which indicates whether the eNB is configured to support DCNR with the connection to the NR.

13. The network equipment for the CP entity for mobility management of claim 12, wherein:
when the retrieved indication is indicative that the eNB is configured to support the DCNR with the connection to the NR, the selecting of one of the plurality of SGWs further comprises selecting an SGW configured to support 5G capability; and
when the retrieved indication is indicative that the eNB is configured without support of the DCNR with the connection to the NR, the selecting of one of the plurality of SGWs further comprises selecting an SGW configured without support of the 5G capability.

14. The network equipment of the CP entity for mobility management of claim 12, wherein the one or more processors are further configured to:
receiving, from the eNB, an eNB configuration update message which includes a DCNR support indication which indicates whether the eNB is configured to support DCNR with the connection to the NR; and
updating, in the memory, the DCNR support indication in association with the identification of the eNB.

15. The network equipment for the CP entity for mobility management of claim 12, wherein:
the setup request message comprises an S1 setup request message for establishing the association comprising an S1 association over an S1-MME interface of the network equipment.

16. A method comprising:
at a network element comprising a control plane (CP) entity for mobility management for use in a mobile network,
for each one of a plurality of eNodeBs (eNBs), receiving from the eNB, an S1 setup request message for establishing an S1 association with the eNB, the S1 setup request message including an indication which indicates whether the eNB is configured to support Dual Connectivity with New Radio (DCNR) with a connection to a New Radio (NR), and storing in memory the indication in association with an identification of the eNB;

receiving a message including an identification of one of the eNBs operative to serve a user equipment (UE) in the mobile network;

retrieving, from the memory based on the identification of the eNB, the stored indication that is stored in association with the stored identification of the eNB; and selecting one of a plurality of serving gateways (SGWs) for a session of the UE based on the retrieved indication.

17. The method of claim 16, wherein the message including the identification of the one of the eNBs operative to serve the UE in the mobile network comprises one of:

an attach request from the UE; or a path switch request for a handover of the UE to the eNB.

18. The method of claim 16, further comprising:

at the network element comprising the CP entity for mobility management, receiving or obtaining a UE indication which indicates whether the UE is configured to support 5G/DCNR;

receiving or obtaining subscription data for the UE which indicates whether the UE has a 5G/DCNR subscription; and wherein the selecting of one of the plurality of SGWs further comprises selecting one of the plurality of SGWs based on the retrieved indication, the UE indication, and the subscription data.

19. The method of claim 16, wherein:

when the retrieved indication is indicative that the eNB is configured to support DCNR with the connection to the NR, the selecting of one or the plurality of SGWs further comprises selecting an SGW configured to support 5G capability; and when the retrieved indication is indicative that the eNB is configured without support of DCNR with the connection to the NR, the selecting of one of the plurality of SGWs further comprises selecting an SGW configured without support of the 5G capability.

\* \* \* \* \*